(12) United States Patent
Bartolucci et al.

(10) Patent No.: US 11,883,836 B2
(45) Date of Patent: Jan. 30, 2024

(54) DISPENSING DEVICE SUITABLE FOR A FOAMABLE PRODUCT

(71) Applicant: The Procter & Gamble Company, Cincinnati, OH (US)

(72) Inventors: Stefano Bartolucci, Singapore (SG); Paul Owen Nutley, West Chester, OH (US); Nathan Daniel Grubbs, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 16/907,677

(22) Filed: Jun. 22, 2020

(65) Prior Publication Data

US 2020/0316629 A1 Oct. 8, 2020

Related U.S. Application Data

(63) Continuation of application No. PCT/US2019/012453, filed on Jan. 7, 2019.

(30) Foreign Application Priority Data

Jan. 23, 2018 (EP) .................................. 18152909

(51) Int. Cl.
*B05B 11/00* (2023.01)
*B05B 11/10* (2023.01)
*B05B 11/02* (2023.01)

(52) U.S. Cl.
CPC ........ *B05B 11/1001* (2023.01); *B05B 11/028* (2023.01); *B05B 11/1087* (2023.01)

(58) Field of Classification Search
CPC .. B65D 83/205; B65D 83/206; B65D 83/207; B05B 11/3001; B05B 11/3087;
(Continued)

(56) References Cited

U.S. PATENT DOCUMENTS 2,430,718 A  11/1947 Jacobson
2,829,874 A   4/1958 Freeman
(Continued)

FOREIGN PATENT DOCUMENTS

CN  1134816 A  11/1996
CN  1355758 A   6/2002
(Continued)

OTHER PUBLICATIONS

All final and non-final office actions for U.S. Appl. No. 15/926,075.
(Continued)

*Primary Examiner* — Charles P. Cheyney
(74) *Attorney, Agent, or Firm* — John G. Powell; Angela Kathryn Haughey

(57) ABSTRACT

A dispensing device for dispensing a foamable product. The dispensing device comprises a dispensing channel (110; 210; 410). The dispensing channel has: an inlet (111; 211; 411) for communicating with a valve-element (120) of a container (130) containing the foamable product; and an outlet (112; 212; 412) for dispensing the foamable product. The dispensing channel (110; 210; 410) further comprises a variable-volume cavity (140; 240; 440) at the outlet. The variable-volume cavity (140; 240; 440) is defined at least partly by a first component (142; 242; 442) and a second component (144; 244; 444) that is separate from and rigidly movably with respect to the first component to vary the volume of the variable-volume cavity (140; 240; 440) between a first configuration and a second configuration. In the first configuration, the variable-volume cavity (140; 240; 440) has a first volume and the outlet (112; 212; 412) is closed. In the second configuration, the variable-volume cavity has a second volume and the outlet (112; 212; 412) is open. The second volume is greater than the first volume.

12 Claims, 8 Drawing Sheets

(58) Field of Classification Search
CPC ........... B05B 11/00416; B05B 11/3053; B05B 12/00; B05B 12/002; B05B 12/022; B05B 12/0024; B05B 12/0026
USPC .................................. 222/162, 402.1–402.2
See application file for complete search history.

(56) References Cited

U.S. PATENT DOCUMENTS

| | | | |
|---|---|---|---|
| 2,911,159 A * | 11/1959 | Doyle | B65D 83/207 239/573 |
| 3,024,787 A | 3/1962 | Birch et al. | |
| 3,032,803 A | 5/1962 | John | |
| 3,085,329 A | 4/1963 | Golczynski | |
| 3,104,785 A | 9/1963 | Knapp | |
| 3,235,135 A | 2/1966 | Henri | |
| 3,247,640 A | 4/1966 | De Wayne Miles et al. | |
| 3,250,444 A | 5/1966 | Ward | |
| 3,333,744 A | 8/1967 | Nilsen et al. | |
| 3,361,301 A | 1/1968 | Philip | |
| 3,415,426 A | 12/1968 | Kleveland | |
| 3,506,165 A * | 4/1970 | Beard | B65D 83/46 222/402.22 |
| 3,584,789 A * | 6/1971 | Traynor | B65D 83/20 239/117 |
| 3,672,546 A | 6/1972 | Ruhle | |
| 3,981,419 A | 9/1976 | Nilson | |
| 4,052,002 A | 10/1977 | Stouffer et al. | |
| 4,122,845 A | 10/1978 | Stouffer | |
| D267,855 S | 2/1983 | French | |
| 4,433,797 A | 2/1984 | Galia | |
| 4,562,942 A | 1/1986 | Diamond | |
| 4,592,743 A | 6/1986 | Hjertman et al. | |
| 4,694,975 A | 9/1987 | Hagan | |
| 4,720,046 A | 1/1988 | Morane | |
| 4,796,812 A | 1/1989 | Grollier | |
| 4,877,156 A | 10/1989 | Clanet | |
| 4,892,232 A | 1/1990 | Martin | |
| 4,896,832 A | 1/1990 | Howlett | |
| 4,919,312 A | 4/1990 | Beard | |
| 4,941,598 A | 7/1990 | Lambelet, Jr. et al. | |
| 4,958,755 A | 9/1990 | Gerstung | |
| 5,018,643 A | 5/1991 | Bolduc | |
| 5,031,802 A | 7/1991 | Joulia | |
| 5,056,690 A | 10/1991 | Ichihara | |
| D324,171 S | 2/1992 | Morane | |
| 5,096,098 A * | 3/1992 | Garcia | B65D 47/248 222/518 |
| 5,105,995 A | 4/1992 | Martin | |
| 5,199,616 A | 4/1993 | Martin | |
| 5,305,930 A * | 4/1994 | De Laforcade | B65D 47/249 222/402.13 |
| 5,368,231 A | 11/1994 | Brunerie et al. | |
| 5,370,313 A * | 12/1994 | Beard | B65D 47/243 239/337 |
| 5,429,280 A | 7/1995 | Bauer et al. | |
| 5,441,181 A | 8/1995 | Scheindel | |
| D364,811 S | 12/1995 | Zimmerhackel et al. | |
| 5,520,310 A | 5/1996 | Bauer et al. | |
| 5,577,641 A | 11/1996 | De | |
| 5,624,055 A | 4/1997 | Clanet | |
| 5,678,765 A | 10/1997 | Dobbs et al. | |
| 5,702,058 A | 12/1997 | Dobbs et al. | |
| 5,725,155 A | 3/1998 | Grunenberg et al. | |
| 5,730,332 A | 3/1998 | Zimmerhackel | |
| 5,848,729 A | 12/1998 | Thornton | |
| D406,240 S | 3/1999 | Guillemot | |
| 5,875,927 A | 3/1999 | D, Andrade | |
| 5,904,274 A | 5/1999 | Warby | |
| 5,914,085 A | 6/1999 | Zimmerhackel | |
| 6,004,300 A | 12/1999 | Butcher | |
| 6,095,182 A | 8/2000 | Warby | |
| 6,260,738 B1 | 7/2001 | Kerr | |
| 6,334,553 B1 | 1/2002 | Bouras | |
| 6,405,898 B1 | 6/2002 | O'Connor et al. | |
| 6,494,349 B1 | 12/2002 | Thompson et al. | |
| 6,607,106 B2 | 8/2003 | Henry et al. | |
| 6,745,920 B2 | 6/2004 | Gupta | |
| 7,104,424 B2 | 9/2006 | Kolanus | |
| 7,306,123 B2 | 12/2007 | Masuda | |
| 7,306,124 B2 | 12/2007 | Masuda | |
| 7,665,923 B2 | 2/2010 | Py et al. | |
| 8,006,868 B2 | 8/2011 | Geiberger et al. | |
| 8,191,802 B2 | 6/2012 | Khan et al. | |
| 8,261,952 B2 * | 9/2012 | Canfield | B05B 11/0072 222/402.12 |
| 8,387,827 B2 | 3/2013 | Helf | |
| 8,616,417 B2 | 12/2013 | Neuhaus | |
| 8,720,747 B2 | 5/2014 | Hoagland | |
| 8,794,600 B2 | 8/2014 | Chou | |
| 8,814,005 B2 | 8/2014 | Banks et al. | |
| 8,863,994 B2 * | 10/2014 | Neuhaus | B65D 83/201 222/402.13 |
| 8,950,691 B2 | 2/2015 | Chen | |
| 9,211,994 B2 | 12/2015 | Andersen | |
| 9,403,636 B2 | 8/2016 | Bodet et al. | |
| 9,469,468 B2 | 10/2016 | Shibata | |
| 10,022,740 B2 | 7/2018 | Van Swieten et al. | |
| 10,227,173 B2 | 3/2019 | Clauwaert et al. | |
| 10,364,092 B2 * | 7/2019 | Schroer | B65D 83/46 |
| 10,364,093 B2 | 7/2019 | Bartolucci | |
| 10,370,178 B2 * | 8/2019 | Schroer | B65D 83/207 |
| 10,449,131 B2 | 10/2019 | Li et al. | |
| 10,479,587 B2 | 11/2019 | Mizoguchi et al. | |
| 10,625,929 B2 | 4/2020 | Bartolucci | |
| 10,625,930 B2 | 4/2020 | Takahashi | |
| 10,717,094 B2 | 7/2020 | Takagi | |
| 10,850,914 B2 | 12/2020 | Bartolucci | |
| 2002/0162450 A1 | 11/2002 | Frost | |
| 2005/0103811 A1* | 5/2005 | Heukamp | B65D 83/206 222/402.13 |
| 2005/0155980 A1 | 7/2005 | Neuhalfen | |
| 2006/0065677 A1 | 3/2006 | Py | |
| 2006/0196889 A1 | 9/2006 | Masuda | |
| 2006/0219823 A1 | 10/2006 | Eberhardt | |
| 2007/0051754 A1 | 3/2007 | Strand | |
| 2007/0090133 A1* | 4/2007 | Macleod | B65D 83/753 222/402.13 |
| 2007/0095853 A1 | 5/2007 | Bonney et al. | |
| 2007/0125799 A1 | 6/2007 | Bonney | |
| 2007/0137643 A1 | 6/2007 | Bonney | |
| 2007/0164049 A1 | 7/2007 | Bonney | |
| 2007/0175917 A1 | 8/2007 | Bonney | |
| 2008/0061083 A1 | 3/2008 | Masuda | |
| 2008/0083776 A1 | 4/2008 | Gupta | |
| 2008/0093380 A1* | 4/2008 | Geiberger | B05B 11/3097 222/571 |
| 2008/0110941 A1* | 5/2008 | Foster | B05B 11/007 222/507 |
| 2008/0149098 A1 | 6/2008 | Bonney | |
| 2008/0272144 A1 | 11/2008 | Bonney | |
| 2009/0050650 A1 | 2/2009 | Walters et al. | |
| 2009/0272765 A1* | 11/2009 | Seki | B65D 83/752 222/321.3 |
| 2010/0308082 A1 | 12/2010 | Lamble | |
| 2011/0011889 A1 | 1/2011 | Bonney | |
| 2012/0006859 A1 | 1/2012 | Wilkinson | |
| 2013/0019802 A1 | 1/2013 | Leck | |
| 2013/0065053 A1 | 3/2013 | Kikuchi et al. | |
| 2013/0068119 A1 | 3/2013 | Kennedy | |
| 2014/0209633 A1 | 7/2014 | Mcdaniel | |
| 2015/0090736 A1 | 4/2015 | Erickson et al. | |
| 2016/0129197 A1 | 5/2016 | Hetting | |
| 2016/0302624 A1 | 10/2016 | Little | |
| 2017/0182699 A1* | 6/2017 | Kase | B29C 48/12 |
| 2018/0072485 A1 | 3/2018 | Fore | |
| 2018/0201434 A1* | 7/2018 | Presche | B05B 11/3059 |
| 2018/0243763 A1 | 8/2018 | Eurippini | |
| 2018/0273280 A1 | 9/2018 | Bartolucci et al. | |
| 2018/0273290 A1* | 9/2018 | Claeys | B65D 90/205 |
| 2019/0030551 A1 | 1/2019 | Williams | |
| 2019/0071242 A1 | 3/2019 | Bartolucci | |
| 2019/0152684 A1 | 5/2019 | Bartolucci | |
| 2020/0016045 A1 | 1/2020 | Aubert et al. | |

(56) References Cited

U.S. PATENT DOCUMENTS

| | | | |
|---|---|---|---|
| 2020/0016046 | A1 | 1/2020 | Aubert et al. |
| 2020/0108003 | A1 | 4/2020 | Iwata et al. |
| 2020/0148458 | A1 | 5/2020 | Bartolucci |
| 2020/0148459 | A1 | 5/2020 | Bartolucci |
| 2021/0039876 | A1 | 2/2021 | Bartolucci et al. |

FOREIGN PATENT DOCUMENTS

| | | | |
|---|---|---|---|
| CN | 200977495 | Y | 11/2007 |
| CN | 101863350 | A | 10/2010 |
| CN | 102056818 | A | 5/2011 |
| CN | 103328551 | A | 9/2013 |
| CN | 104640640 | A | 5/2015 |
| CN | 105392370 | A | 3/2016 |
| CN | 107830192 | A | 3/2018 |
| CN | 108521762 | A | 9/2018 |
| CN | 108602612 | A | 9/2018 |
| CN | 105593137 | B | 4/2021 |
| DE | 3147004 | A1 | 5/1983 |
| DE | 19937554 | A1 | 3/2001 |
| DE | 202016101580 | U1 | 8/2017 |
| EP | 0571280 | B1 | 5/1997 |
| EP | 1380520 | A2 | 1/2004 |
| EP | 3409618 | A1 | 12/2018 |
| FR | 1454371 | A | 9/1966 |
| FR | 2311593 | A1 | 12/1976 |
| FR | 2990421 | B1 | 2/2015 |
| GB | 1207408 | A | 9/1970 |
| GB | 1414637 | A | 11/1975 |
| JP | H0220959 | U | 2/1990 |
| JP | H0462677 | U | 5/1992 |
| JP | H0535772 | U | 5/1993 |
| JP | H066278 | U | 1/1994 |
| JP | 2000309387 | A | 11/2000 |
| JP | 2006089091 | A | 4/2006 |
| JP | 2007532181 | A | 11/2007 |
| JP | 2009082814 | A | 4/2009 |
| JP | 2011067362 | A | 4/2011 |
| JP | 2013241203 | A | 12/2013 |
| JP | 2015120140 | A | 7/2015 |
| JP | 2018024461 | A | 2/2018 |
| JP | 2018058591 | A | 4/2018 |
| JP | 2018100105 | A | 6/2018 |
| WO | 9427890 | A1 | 12/1994 |
| WO | 2004045778 | A1 | 6/2004 |
| WO | 2017115827 | A1 | 7/2017 |

OTHER PUBLICATIONS

All final and non-final office actions for U.S. Appl. No. 16/118,663.
All final and non-final office actions for U.S. Appl. No. 16/184,367.
All final and non-final office actions for U.S. Appl. No. 16/194,502.
All final and non-final office actions for U.S. Appl. No. 16/666,879.
All final and non-final office actions for U.S. Appl. No. 17/076,907.
European Search Report for 17162178.2 dated Aug. 21, 2017.
European Search Report for EP 17175852.7 dated Sep. 19, 2017.
European Search Report for EP 17189053.6 dated Feb. 28, 2018.
European Search Report for EP 17203315.1 dated May 4, 2018.
European Search Report for EP18152909.0 dated Jun. 18, 2018.
PCT International Search Report and Written Opinion for PCT/US2018/058653 dated Jan. 25, 2019.
PCT International Search Report and Written Opinion for PCT/US2019/012453 dated Apr. 1, 2019.
PCT International Search Report and Written Opinion for PCT/US2019/060172 dated Apr. 23, 2020.
PCT International Search Report and Written Opinion for PCT/US2019/060173 dated Jun. 2, 2020.

* cited by examiner

DISPENSING DEVICE SUITABLE FOR A FOAMABLE PRODUCT

FIELD OF THE INVENTION

The present invention relates to dispensing devices for foamable products. In particular, it relates to dispensing devices for foamable personal care products.

BACKGROUND OF THE INVENTION

Dispensing devices for dispensing a foamable product from a container are known in the art. In one example, the dispensing device is disposed on top of a pressurized container containing a foamable product. The dispensing device comprises a flow passage that is coupled at one end to a discharge valve of the pressurized container. A discharge outlet is provided at the other end of the flow passage. To dispense the foamable product, the user presses an actuator part of the dispensing device. This opens the discharge valve of the container. Product then flows into the flow passage and is discharged through the discharge outlet. This discharge occurring from the discharge outlet is driven by the flow of foamable product entering the flow passage from the container, propelled by the vapor pressure of the propellant in the container. The foamable product also expands into a foam within the flow passage as it is being dispensed, such that the volumetric flow rate at the discharge outlet is greater than that at the discharge valve of the container.

After a desired amount of foam has been dispensed, the user releases the actuator, closing the discharge valve of the container, and thereby shutting off the supply of product to the flow passage. However, continued expansion of the product that is already in the flow passage can cause the product to drool out of the discharge outlet.

For present purposes, drool can be defined as an unwanted discharge of foam (or foamable product) from a discharge outlet after dispensing has been stopped by a user, caused by the continued expansion of the foam in the passage between the container-valve and the discharge outlet.

A dispensing device for a foamable product is known from U.S. Pat. No. 6,405,898. It features a system to reduce drool.

In one embodiment, the dispensing device features a nozzle member comprising a flow passage and a movable portion movable between a discharge position and an inactive position. When the movable portion is in the discharge position, the flow passage is in fluid communication with the exterior of the device. When the movable portion is in the inactive position, the flow passage is in fluid communication with a waste product containment region. As such, when the movable portion is in the discharge position and foam is being discharged, the foam is directed to the exterior of the dispensing device. After discharge, and with the movable portion in the inactive position, foamable product (and/or foam) remaining in the flow passage is directed into the waste product containment region.

With the dispensing device of U.S. Pat. No. 6,405,898, there is a chance for undesired leakage of the foamable product from the nozzle member, particularly during a transient period when the movable portion is between the discharge position and the inactive position. Also, an amount of the dispensed product will be collected in the waste product containment region and therefore wasted. These drawbacks are particularly severe with foamable compositions that have high blooming—potentially increasing 5-10 times in volume from the moment they are dispensed to their fully expanded state. For such compositions, the amount of product collected inside the dispensing device will not only be wasted, but it can also expand until it leaks out of the containment region, thereby creating a mess and giving the impression that the dispensing device is not functioning properly.

SUMMARY OF THE INVENTION

The present inventors have recognized that it would be desirable to provide a dispensing device for foamable products that exhibits minimal drool—in particular for foamable products with very high post actuation blooming. Even more desirably, this would be done without wasting an amount of the product or sacrificing the flow rate of foamable product during dispensing.

The invention is defined by the claims. According to an aspect of the invention, there is provided a dispensing device for dispensing a foamable product, the dispensing device comprising a dispensing channel, the dispensing channel having
        an inlet for communicating with a valve-element of a container containing the foamable product and
        an outlet for dispensing the foamable product;
    the dispensing channel further comprising a variable-volume cavity at the outlet,
    wherein the variable-volume cavity is defined at least partly by a first component and a second component that is separate from and rigidly movably with respect to the first component to vary the volume of the variable-volume cavity between a first configuration and a second configuration,
    wherein, in the first configuration, the variable-volume cavity has a first volume and the outlet is closed, and in the second configuration, the variable-volume cavity has a second volume and the outlet is open,
    wherein the second volume is greater than the first volume.

A dispensing device with this configuration can provide the combined benefits of firm closure of the outlet and a relatively small dead volume at the outlet, in the first configuration. This can help to reduce the amount of drool following a dispensing event. Meanwhile, with the outlet open in the second configuration, the dispensing device can permit a relatively high flow rate of foamable product out of the outlet. At the end of dispensing, the transition from the second (open) configuration back to the first (closed) configuration may expel residual foamable product from the end of the dispensing channel at the outlet, thereby helping to reduce the amount of residual foamable product that is present at the outlet. By expelling more of the foamable product at the end of dispensing, the present dispensing device can reduce the quantity of foamable product that is available to drool out of the outlet afterwards.

In some embodiments, the variable volume cavity may be defined exclusively by the first component and the second component.

"Rigidly movable" means that the change in volume of the variable-volume cavity is determined (primarily or entirely) by relative motion of the two components rather than by flexing or expansion of either component. Hence, even if one or both of the components is formed of a material that is flexible, the device does not rely on this flexibility to produce the change in volume. The relative motion may be translational, rotational, or a combination of translational and rotational motion.

To transition from the first configuration to the second configuration, the first and second components may move apart. To transition from the second configuration to the first configuration, the first and second components may move toward one another, preferably coming together in the first configuration.

A foamable product may be a composition comprising a liquid or gel and a blooming agent.

A blooming agent (also known as a "blowing agent" or "pneumatogen") is a substance that is capable of producing a cellular structure via a foaming process. It is typically applied when the blown material is in a liquid stage. Blooming agents are typically classified as either physical or chemical blooming agents. For physical blooming agents, the gas is formed when the blooming agent changes state from liquid to gas as a result of a pressure change. In chemical blooming agents, the gas is formed by a chemical reaction of the blooming agent with another material.

The blooming agent may include but is not limited to materials that are known in the art as blooming agents, such as trichlorofluoromethane, dichlorodifluoromethane, dichlorotetrafluoroethane, monochlorodifluoromethane, trichlorotrifluoroethane, dimethylether, carbon dioxide, nitrous oxide, and hydrocarbons such as propane, n-butane and isobutane, and mixtures thereof.

The blooming agent is preferably contained in the composition at a level from about 1% to about 15%, more preferably from about 2% to about 10%, still more preferably from about 2.5% to about 5.5% by weight of the composition. When a blooming agent such as dimethylether utilizes a vapor pressure suppressant (for example, trichloroethane or dichloromethane), the amount of suppressant is included as part of the blooming agent.

The first component and the second component may contact one another in the first configuration, preferably such that the first volume of the cavity is substantially zero.

Preferably, there is no void space between the first component and the second component in the first configuration. That is, the first component is flush with the second component and/or the first component and the second component mate with one another to eliminate the void space.

The surface of the first component facing the second component may be complementary in shape to the surface of the second component facing the first component. This may facilitate engagement between them.

The outlet may be defined by at least one opening, the at least one opening being closed in the first configuration.

The outlet may be defined by a plurality of openings, wherein each of the plurality of openings is closed in the first configuration.

The at least one opening may be defined between the first component and the second component.

For example, the first component and the second component may act as a pair of jaws, cooperating with one another to define the at least one opening between them.

Alternatively, the at least one opening may be defined in the first component.

For example, the first component may comprise a wall with the at least one opening in it.

The second component may comprise at least one outwardly facing projection configured to engage in the at least one opening in the first configuration.

Here, outwardly means in the direction of flow of the foamable product. Inwardly means the opposite direction.

The second component may be pivotally connected with the first component.

The second component may be slidable relative to the first component.

The first component may comprise a piston chamber and the second component may comprise a piston.

The outlet may be defined in an end of the piston chamber.

In particular, the outlet may be defined by at least one opening, as summarized already above, and the at least one opening may be defined in the end of the piston chamber.

The dispensing channel may comprise a passage formed in the piston.

In such embodiments, the foamable product flows through the piston to reach the variable-volume cavity.

The piston may comprise an O-ring, configured to create a seal between the piston and the wall of the piston chamber. The O-ring may comprise a flexible, resilient polymer such as a thermoplastic elastomer (TPE) or silicone rubber.

The piston may be biased toward the first configuration by resilient biasing means, preferably comprising a spring.

A dead volume at the outlet in the first configuration is preferably less than 100 mm$^3$.

The dead volume is preferably less than 50 mm$^3$, more preferably less than 25 mm$^3$, still more preferably less than 12.5 mm$^3$, most preferably less than 7.5 mm$^3$. The dead volume is the volume at the outlet where residual foamable product may remain, after dispensing, when the dispensing device has been returned to the first configuration. This residual product can expand (or continue to expand), causing drool. It is therefore desirable to minimize the dead volume. The dead volume may be defined as the space located inwardly of the external surface of the dispensing device at the outlet. For example, if the outlet is defined by one or more openings in the first component, then the dead volume would include the volume of these openings. It would also include any additional volume, inwardly of the first component, between the first component and the second component, in fluid communication with the outlet. This "additional" volume may correspond to the first volume of the cavity in the first configuration.

In some embodiments, the second component seals against the first component to close the outlet.

At least a part of the first component or the second component or both may be provided with a sealing element for this purpose. The sealing element may comprise a soft plastic coating or thermoplastic elastomer (TPE). The sealing element may be fabricated by bi-injection molding.

At least one of the first component and the second component may comprise an inwardly facing projection configured to plug the dispensing channel in the first configuration.

The projection may be cone-shaped and may optionally be provided with a sealing element as described above.

The dispensing device preferably comprises an actuator configured to open the valve-element of the container when actuated, wherein actuating the actuator also opens the outlet and causes the volume of the variable-volume cavity to increase from the first configuration to the second configuration.

The actuator is preferably configured to press the inlet of the dispensing channel against the valve-element of the container to open the valve-element.

Optionally, the actuator is configured such that, when actuated, it opens the outlet, expands the variable-volume cavity, and presses the inlet of the dispensing channel against the valve-element of the container to open the valve-element.

Preferably, the actuator and variable-volume cavity are collectively configured such that, when the actuator is actuated, it initially opens the outlet and expands the variable-volume cavity and subsequently opens the valve-element.

Typically, the valve-element of the container of the container is resiliently biased toward its closed configuration The variable-volume cavity may be resiliently biased towards the first configuration. In some embodiments, this resilient biasing may be provided by the valve element of the container; or resilient flexibility of the dispensing channel, or both working together in combination. Alternatively or in addition, separate resilient biasing means (such as a coil or leaf spring) may be provided to bias the variable-volume cavity toward the first configuration.

The resilient biasing of the variable-volume cavity may exert a weaker biasing force than the resilient biasing of the valve-element. This can help to ensure that (at least some) expansion of the volume of the variable-volume cavity occurs before the valve-element is opened.

Preferably, when the actuator is released, firstly the valve-element closes and subsequently the volume of the variable-volume cavity contracts from the second configuration to the first configuration.

A direction of actuation of the actuator may be: substantially parallel to an axial direction of the inlet of the dispensing channel; or substantially perpendicular to an axial direction of the inlet of the dispensing channel.

The dispensing device may include a cam configured to convert the motion of the actuator into a force that expands the variable-volume cavity.

The actuator may comprise at least one of a lever and a button.

When the actuator comprises a lever, a fulcrum of the lever may comprise a living hinge.

The dispensing device may further comprise the container containing the foamable product, wherein the valve-element of the container is coupled to the inlet of the dispensing channel.

The container may contain a cosmetic product and a propellant.

The cosmetic product may comprise a foamable hair cosmetic product, such as a foamable shampoo or foamable conditioner. Expansion pressures of such products may be higher than other foamable products typically dispensed in this way. Therefore, it is particularly desirable to obtain better control of drooling for such products.

The dispensing device is preferably suitable for dispensing an aerosol foam from a container that contains the foamable product and a propellant.

If the container has a male-type valve, the valve-element may be a valve-stem. If the container has a female-type valve, the valve-element may be a spring cup.

When the inlet of the dispensing channel bears against the valve-element to a sufficient extent, the discharge valve of the container opens, allowing the foamable product to flow out of the container into the dispensing channel.

The dispensing channel may be flexible and resilient.

This can allow the inlet of the dispensing channel to be biased against the valve-element of the container by flexing of the dispensing channel. This may enable the outlet of the dispensing channel to remain static relative to the container, while the actuator is being actuated and the product is being dispensed.

The dispensing channel may comprise a tube between the inlet and the outlet. The dispensing channel is preferably elastically deformable. The dispensing channel is preferably defined at least in part by a flexible resilient material, optionally a flexible resilient plastic material, such as a polyolefin. Most preferably, the dispensing channel is formed of polypropylene.

The inlet and outlet of the dispensing channel may have different orientations. Optionally, the dispensing channel may include a bend or corner. In particular, the dispensing channel may include a bend or corner such that the outlet is oriented differently to the inlet. An angle between the inlet and outlet may be in the range 30° to 150°, preferably in the range 45° to 135°, more preferably in the range 60° to 120°. (Here, an angle of 0° would indicate that the inlet and outlet have the same orientation.)

The dispensing device may further comprise a shroud for concealing the dispensing channel when the dispensing device is attached to a container containing the foamable product, wherein the position of the outlet of the dispensing channel is fixed relative to the shroud.

In particular, the outlet may remain stationary when the foamable product is being dispensed (or respectively, when the actuator is actuated). Moreover, the outlet may remain stationary when the inlet is displaced as the foamable product is being dispensed.

If the dispensing device comprises a shroud, the shroud may engage with the container.

If the outlet of the dispensing channel is fixed relative to the shroud, then the outlet is preferably also fixed relative to the container.

The foamable product may form a foam having a density in the range 0.4 to 0.5 $g/cm^3$ immediately after dispensing. The foam may have a density in the range 0.1 to 0.2 $g/cm^3$ one minute after being dispensed. Thus, the foam may continue to expand significantly for some time after it has been dispensed.

BRIEF DESCRIPTION OF THE DRAWINGS

The invention will now be described by way of example with reference to the accompanying drawings in which.

DETAILED DESCRIPTION OF THE INVENTION

Figure 1A:
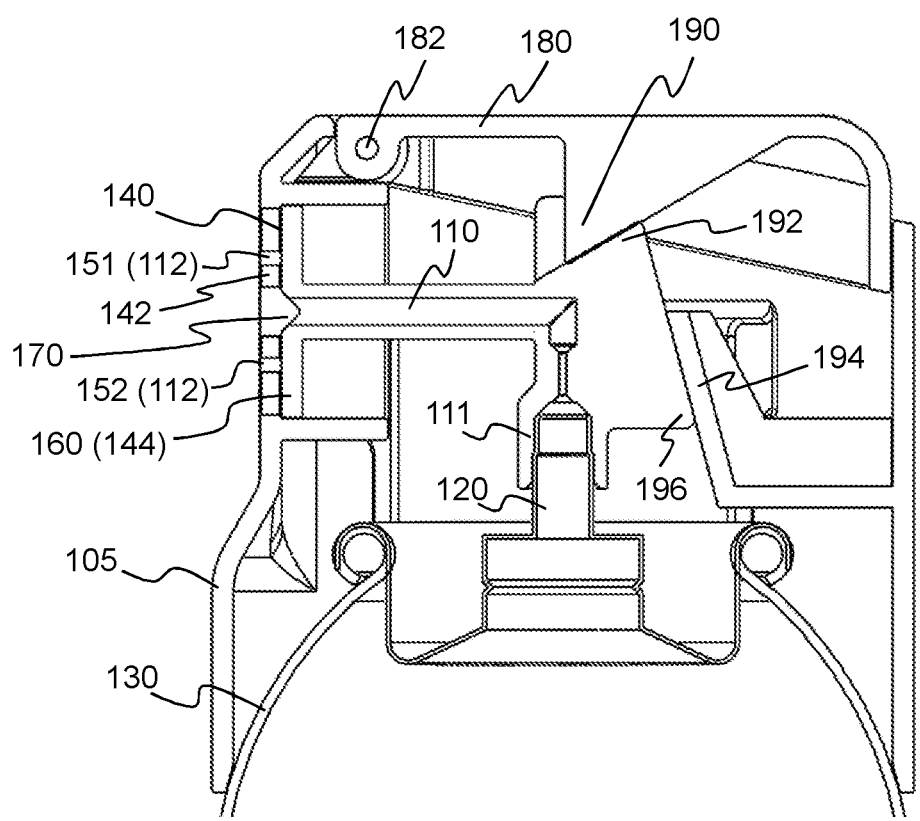
FIG. 1A shows a cross section through a dispensing device according to a first embodiment of the present invention, in a first, closed configuration.

FIG. 1A is a cross sectional side view showing a dispensing device, suitable for dispensing a foamable product, according to a first embodiment of the invention. The drawing shows the dispensing device attached to the top of a container 130, which contains the foamable product.

The dispensing device comprises a dispensing channel 110, which has an inlet 111 and an outlet 112. The inlet 111 is coupled to and in fluid communication with a valve-element 120 of the container 130. In this embodiment, the valve-element 120 is a valve stem. The outlet 112 is in fluid communication with the exterior of the dispensing device, to allow the foamable product to be dispensed.

Figure 1B:
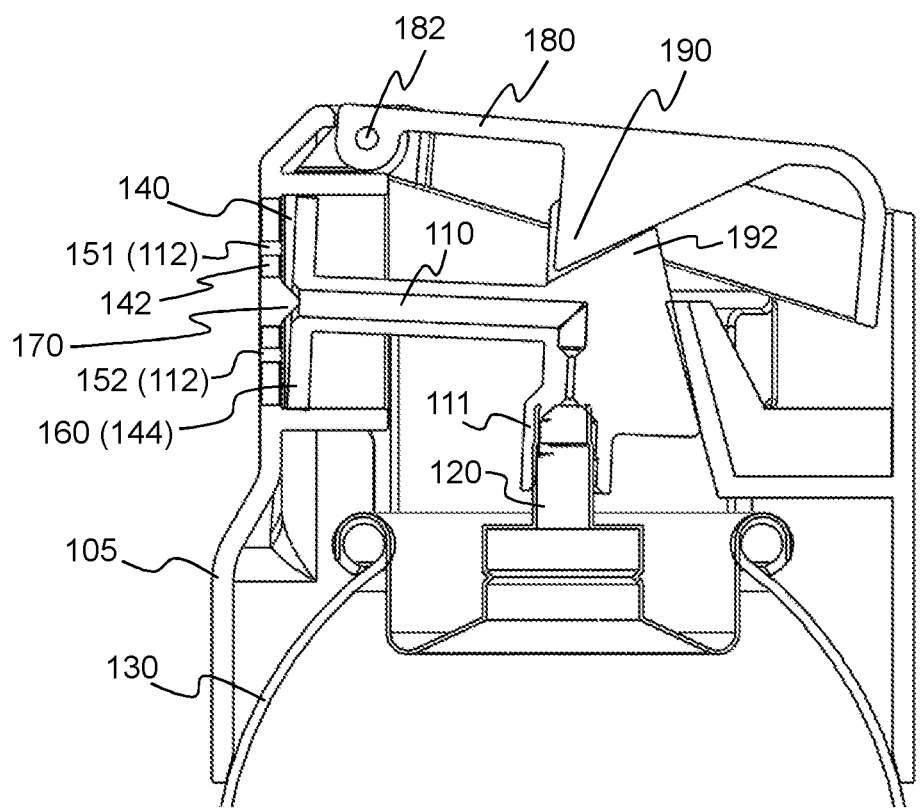
FIG. 1B shows the dispensing device of FIG. 1A in a second, open configuration.

The dispensing channel further comprises a variable-volume cavity 140 at the outlet 112. This cavity 140 is defined by a first component 142 and a second, separate component 144. The cavity 140 is the space between these two components. The second component 144 is able to slide (and tilt) with respect to the first component 142, so as to vary the volume of the cavity between a first configuration and a second configuration. FIG. 1A shows the first configuration and FIG. 1B shows the second configuration. In the first configuration, the variable-volume cavity 140 has a first volume; in the second configuration, the variable-volume cavity 140 has a second volume, larger than the first volume. The sliding and tilting of the second component 144 with respect to the first component 142 comprises a substantially rigid motion—that is, substantially no deformation of either component is required in order to allow the sliding and tilting.

In this embodiment, the first volume of the variable-volume cavity 140 is negligible or zero, since the first component 142 and the second component 144 are flush with one another in the first configuration. That is, there is no space between the first component and the second component in the first configuration. To reach the second configuration, the second component 144 is withdrawn from the first component 142, by sliding and tilting it, to create a void space between the two components. In the first configuration, the outlet 112 is closed; in the second configuration, the outlet 112 is open.

In the present embodiment, the outlet 112 is defined by two openings 151 and 152 in the first component 142. In particular, the second component 144 is a piston 160 and the first component 142 is a piston chamber. The openings 151 and 152 are defined in the end wall of the piston chamber. In this example, the openings 151 and 152 are horizontal slots (with each slot extending out of the plane of the drawing).

The dispensing channel 110 comprises a passage formed through the piston 160. This passage is in fluid communication with the variable-volume cavity 140, when the components are in the second configuration. When the components are in the first configuration, the outer end of the passage is blocked and sealed by an inwardly facing conical projection 170 on the inner side of the end wall of the piston chamber. This conical projection 170 acts as a plug and contributes to the closure of the outlet 112 in the first configuration. The closure of the outlet 112 is also assisted by the contact between the piston 160 and the end wall, by which the piston 160 covers and closes the openings 151 and 152.

The dispensing device further comprises an actuator 180, which in this embodiment comprises a lever. The fulcrum of the lever is provided by a pin 182 positioned above the piston and piston chamber. A cam 190 is provided on the underside of the lever 180. This is configured to engage with a cam follower 192 provided on an upper side of the dispensing channel 110 above the inlet 111.

When a user wishes to dispense foam, the user pushes down on the actuator lever. As the lever pivots downwards, the cam 190 engages the cam follower 192. This results in a force downwards and to the rear being applied to the dispensing channel 110, above the location of the inlet 111. The downward component of the force tilts the dispensing channel 110, so that the piston 160 tilts away from the end wall of the piston chamber. At the same time, the rearward component of the force pulls the piston 160 backwards, away from the end wall of the piston chamber. Thus, the dispensing device transitions from the first configuration to the second configuration, in which the outlet 112 is open and there is a nonzero void space in the variable-volume cavity 140 (see FIG. 1B).

As the user continues to push down on the actuator 180, the downward component of the force transmitted through the cam 190 and cam follower 192 presses down on the valve-element 120 of the container 130. This opens the valve, allowing the foamable product to flow out of the container under the force of a propellant. The foamable product flows into the inlet 111 of the dispensing channel 110, through the variable-volume cavity 140, and out through the outlet 112 (openings 151 and 152).

When the user has dispensed the desired amount of foamable product, the user releases the actuator 180. This firstly releases the downward force on the valve-element 120, causing the valve to close and thereby stopping the flow of foamable product out of the container 130. Subsequently, as the user completely releases the actuator 180, the piston 160 returns to the first configuration (FIG. 1A), closing the outlet 112 of the dispensing channel 110.

In this embodiment, the piston 160 is resiliently biased back to the first configuration by the valve-element 120. Such valve-elements typically comprise biasing means, such as a spring, to bias the valve toward its closed configuration. The biasing means exerts an upward force on the valve-element, which in this embodiment is transmitted to the inlet 111 of the dispensing channel 110. This force tends to tilt the dispensing channel back towards the first configuration. A second cam 194 at the back of the dispensing device engages with a second cam follower 196 at the back of the dispensing channel 110, converting the upward force from the valve element 120 into a lateral translation of the dispensing channel 110. This translation slides the piston forwards, returning it to the first configuration. In this way, the resilient biasing of the valve-element 120 is able to restore the dispensing device to the first configuration, by tilting and sliding the piston 160.

In the first embodiment, shown in FIGS. 1A and 1B, the dispensing channel 110 comprises a tube extending between the piston 160 and the inlet 111. This may be formed of a flexible plastics material, such as polypropylene. Indeed, the entire dispensing channel 110 may be formed integrally of this material. The tube may flex under the downward force applied by the actuator 180 via the cam 190, as the device transitions from the first configuration to the second configuration. Accordingly, in the second configuration, the tube may also contribute to the restoring forces urging the piston 160 back to its first configuration. Note, however, that the flexing of the polypropylene material is not itself responsible for the expansion of the variable-volume cavity 140—the change in volume is a result of the tilting and sliding of the piston 160.

As the piston moves back to its first configuration, residual foamable product that was left in the variable-volume cavity 140 is expelled through the outlet 112 (openings 151 and 152). Since the piston 160 contacts the end wall of the piston chamber in the first configuration, there is only a very small dead volume remaining—namely, the volume of the openings 151 and 152 themselves. This dead volume is the volume of the dispensing channel at the outlet that remains in fluid communication with the exterior of the dispensing device (that is, the atmosphere) in the first configuration. Residual foam left in this dead volume can expand and cause drooling. By reducing this dead volume, the dispensing device according to the first embodiment can reduce drooling after the dispensing event has completed. In the present embodiment, the dead volume is 40 mm³.

Note that the dispensing device further comprises a shroud 105. The shroud 105 conceals the dispensing channel 110 and the other internal parts of the dispensing device when the dispensing device is attached to the container 130. The outlet 112 of the dispensing channel 110 is preferably fixed relative to the shroud 105 and thereby fixed relative to the container 130. This means that the position of the outlet 112 does not change when the actuator is pressed. However, in some embodiments, the position of the outlet 112 may move relative to the container 130 and/or shroud 105 during actuation.

In the present embodiment, the first component 142, the conical projection 170, and the second cam 194 may be formed integrally with the shroud 105. These and other components of the dispensing device may be formed of plastics material, preferably polypropylene.

Figure 2A:
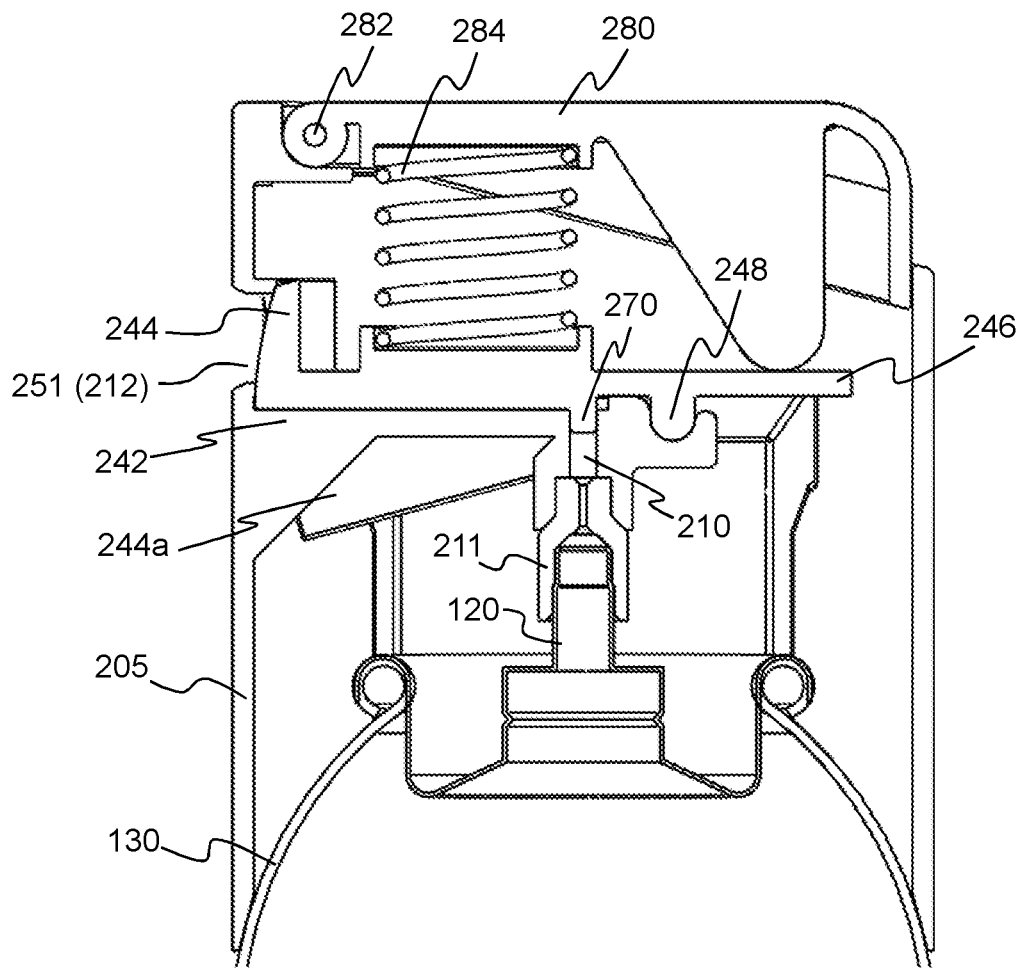
FIG. 2A is a cross section showing a dispensing device according to a second embodiment of the invention, in its first, closed configuration.
Figure 2B:
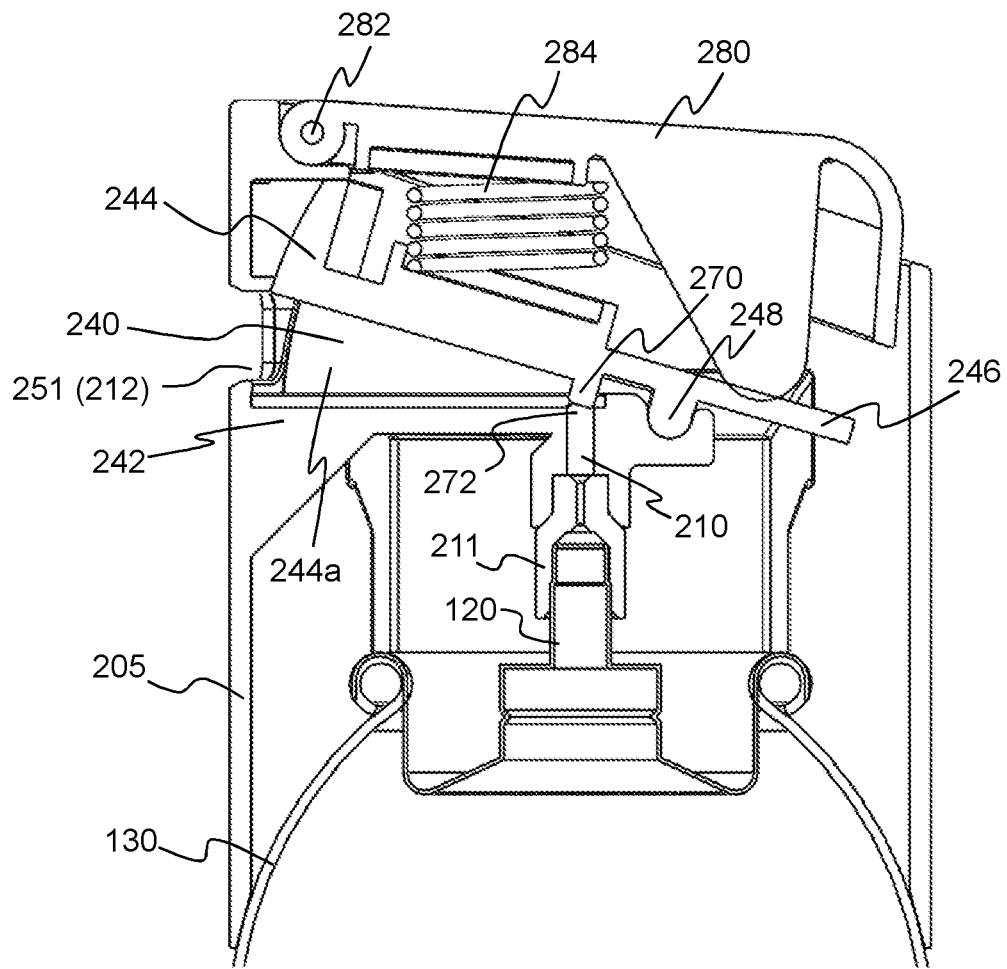
FIG. 2B shows the dispensing device of FIG. 2A in its second, open configuration.

FIGS. 2A and 2B illustrate a dispensing device according to a second embodiment of the invention. FIG. 2A illustrates the dispensing device in its first configuration; FIG. 2B shows the second configuration. The second embodiment differs from the first embodiment primarily in the configuration of the first component and the second component and the way in which they move to change the volume of the variable-volume cavity. Unless described otherwise below, it should be understood that the structure and operation of the dispensing device of the second embodiment is similar to that of the first embodiment. Accordingly, similar reference numerals are used to refer to the component parts.

Like FIGS. 1A and 1B, FIGS. 2A and 2B show the dispensing device attached to the top of a container 130. The dispensing device comprises a dispensing channel 210 having an inlet 211 and an outlet 212. The inlet 211 is coupled to and in fluid communication with the valve-element 120 of the container 130. The dispensing device further comprises a variable-volume cavity 240 at the outlet 212. This cavity 240 is defined by a first component 242 and a second component 244, so that the cavity 240 is the space between the two components. The second component 244 is pivotally connected with the first component 242 and rotatable relative to the first component 242 about an axis 248. The rotational movement of the second component 244 relative to the first component 242 varies the volume of the cavity 240. Once again, there is substantially no deformation of either component to vary the volume of the cavity 240.

Like the first embodiment, in the second embodiment, the variable-volume cavity 240 has a first volume in the first configuration that is negligible or zero, because the first component 242 and the second component 244 meet flush with one another in the first configuration. The principal difference is that the components rotate to meet one another in the second embodiment. To transition to the second configuration, the second component 244 rotates (clockwise, as illustrated) away from the first component 242. This rotation creates a nonzero void space between the two components, defining the cavity 240 in the second configuration.

In the second embodiment, the outlet 212 is defined by a single opening 251 in the outer end of the first component 242. In this example, the opening 251 is circular. The outer end of the second component 244 is shaped into an arc and the inner side of the first component 242 at the outer end (outlet 212) is shaped into a corresponding arc. In this way, the outer end of the second component 244 blocks and closes the opening 251 at the outlet 212 in the first configuration.

In the second configuration, with the second component 244 rotated away from the first component 242, the first component 242 forms the floor of the variable-volume cavity 240. The second component 244 forms the ceiling of the cavity 240. The sides of the cavity 240 are formed by sidewalls 244a, which are attached to the second component 244 and rotate with it. In this embodiment, the sidewalls 244a are formed integrally with the second component 244. The outer end of the cavity 240, where the outlet 212 (opening 251) is provided, is formed by the first component 242.

The second component 244 comprises a downwardly oriented projection 270, which projects inwards into the dispensing channel 210 in the first configuration, so as to plug the dispensing channel 210. This helps to close the outlet 212 in the first configuration. The closure of the outlet is further assisted by the flush contact between the first component 242 and the second component 244, and by the end of the second component 244 covering and blocking the opening 251.

The dispensing device further comprises an actuator 280. Similarly to the first embodiment, the actuator 280 of the second embodiment comprises a lever, whose fulcrum is provided by a pin 282 positioned above the variable-volume cavity 240. Resilient biasing means, comprising a spring 284, is provided coupled to the underside of the actuator 280, to bias the second component 244 towards the first configuration. A downwardly oriented projection the underside of the actuator 280 engages with a lever arm 246 that is rigidly connected with the second component 244 at the opposite side of the axis 248 from the second component 244.

When the user wishes to dispense foam, the user presses down on the actuator lever. As the actuator pivots downwards, turning about the pin 282, the downward projection on its underside presses down on the lever arm 246. This rotates the second component about the axis 248 (clockwise, as shown in the drawings), causing the second component to transition to the second configuration. In the process, the projection 270 is lifted, so that it no longer plugs the dispensing channel 210.

As the user continues to push down on the actuator 280, the downward force is transmitted through the components of the dispensing channel to the valve-element 120, which then opens. As a result, foamable product can flow out of the valve into the inlet 211, through the dispensing channel 210 (including the variable-volume cavity 240) and out through the opening 251.

When the user has dispensed the desired amount of foamable product, the user releases the actuator 280. This firstly releases the downward force on the valve-element 120, allowing the valve to close and thereby stopping the flow of foamable product from the container 130. As the user continues to release the actuator 280, the second component 244 rotates back into the first configuration, plugging the dispensing channel 210 with the projection 270 and closing the outlet 212. In this embodiment, the second component 244 is resiliently biased to the first configuration by the spring 284. The spring 284 biases the second component 244 downwards and at the same time biases the actuator 280 upwards.

As the second component 244 moves back to its first configuration, biased by the spring 284, residual foamable product that was left in the cavity 140 is expelled through the outlet 212 (opening 251). As in the first embodiment, since the first and second components 242 and 244 meet to lie flush with one another in the first configuration, there is a very small dead volume, determined by the cross-sectional area and depth of the opening 251. Thus, the second embodiment, like the first embodiment, can reduce drooling after a dispensing event has completed.

The dispensing device of the second embodiment also comprises a shroud 205. This may be similar to the shroud 105 of the first embodiment. In particular, the first component 242 (and thus the opening 251) may be formed integrally with the shroud 205.

Figure 3A:
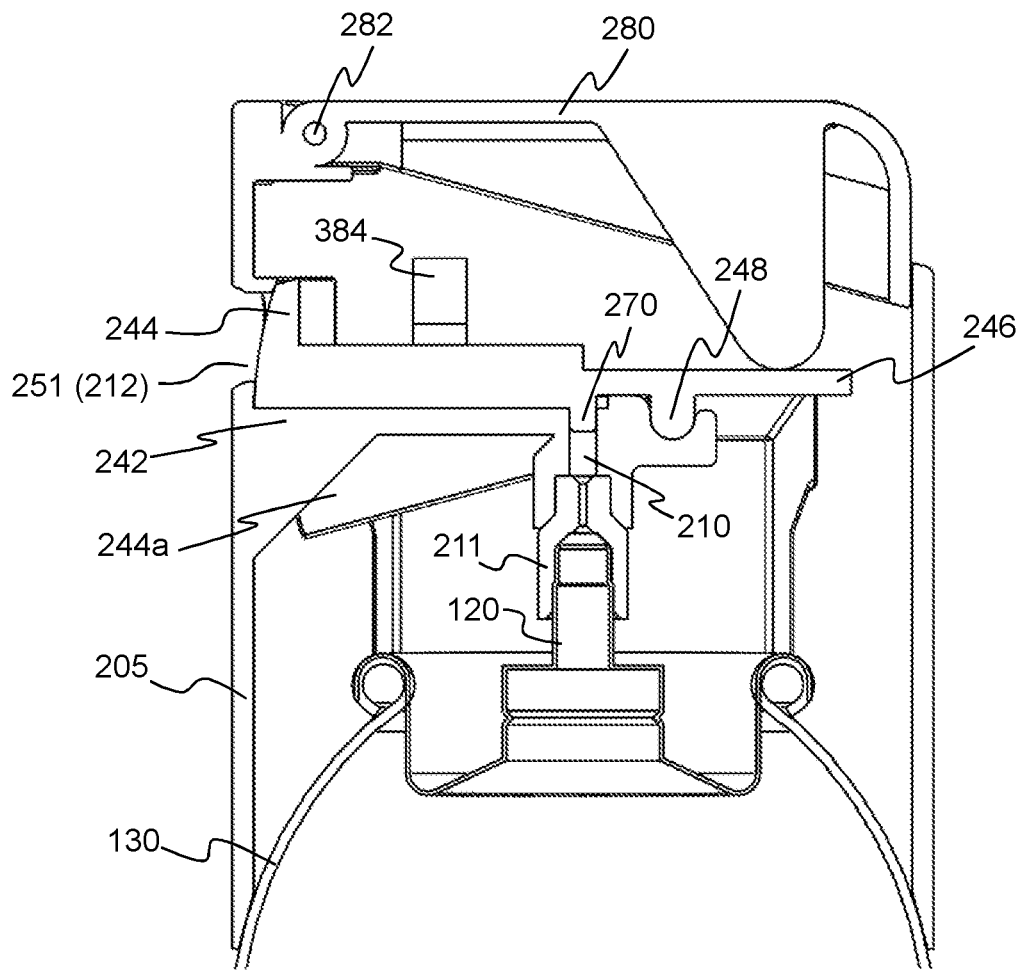
FIG. 3A is a cross section showing a dispensing device according to a third embodiment of the invention, in its first, closed configuration.
Figure 3B:
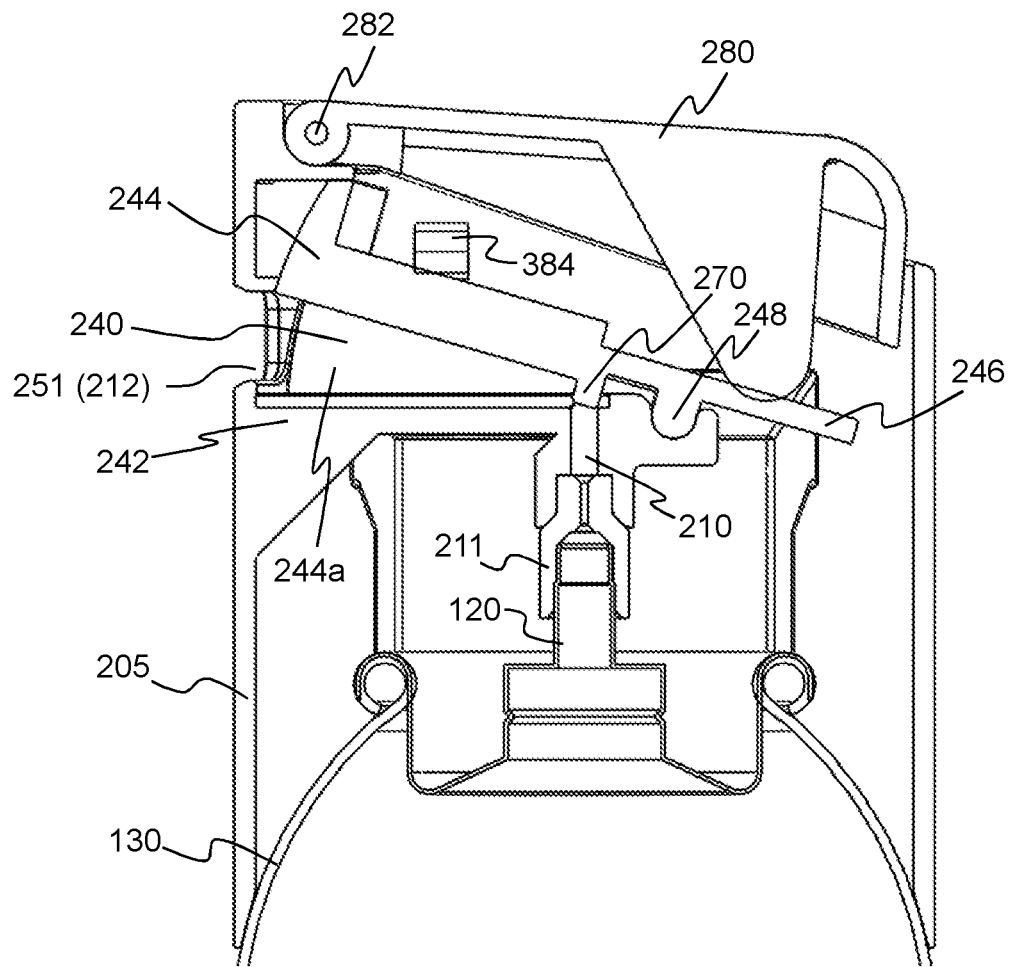
FIG. 3B shows the dispensing device of FIG. 3A in its second, open configuration.

FIGS. 3A and 3B illustrate a dispensing device according to a third embodiment of the invention. FIG. 3A illustrates the device in its first configuration; FIG. 3B illustrates the device in its second configuration. The third embodiment is very similar to the second embodiment and identical features have been given identical reference numerals in the drawings. The description of these features will not be repeated, for the sake of brevity. The difference between the second embodiment and the third embodiment is in the way that the second component 244 is biased toward the first configuration. The second embodiment used a metal coil spring 284 for biasing, compressed between the second component 244 and the actuator 280. In contrast, in the third embodiment, a plastic leaf spring 384 biases the second component 244 toward the first configuration. The spring 384 is attached to the shroud 205 (and may be formed integrally with the shroud 205). The spring 384 pushes the second component 244 downwards (anticlockwise in the drawings), which pushes the lever arm 246 on the opposite side of the axis 248 upwards. This, in turn, pushes the actuator 280 upwards. In this way, the spring 384 indirectly biases actuator upwards.

Figure 4A:
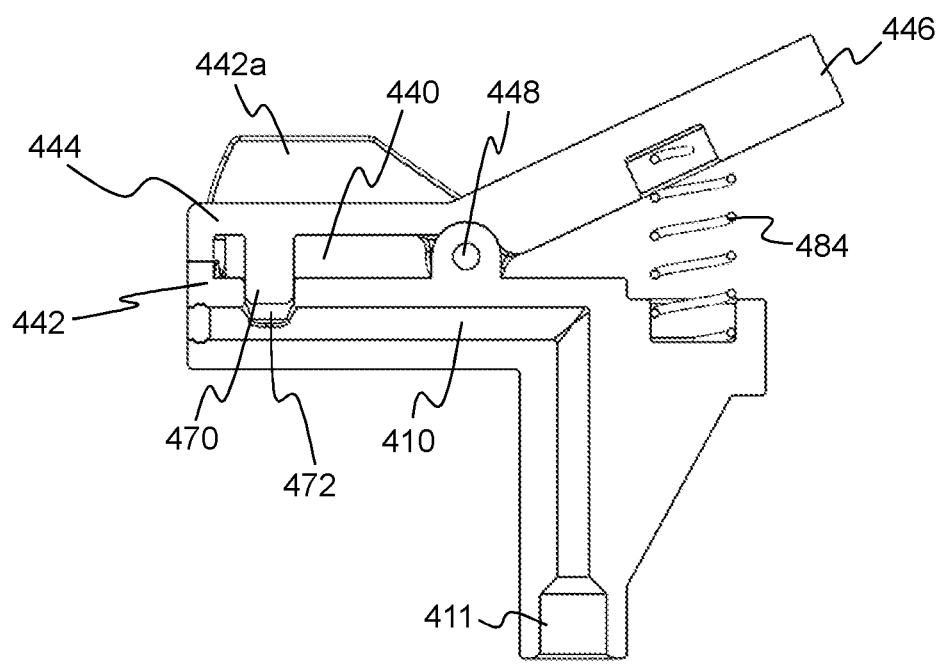
FIG. 4A shows part of a dispensing device according to a fourth embodiment of the invention, in its first, closed configuration.
Figure 4B:
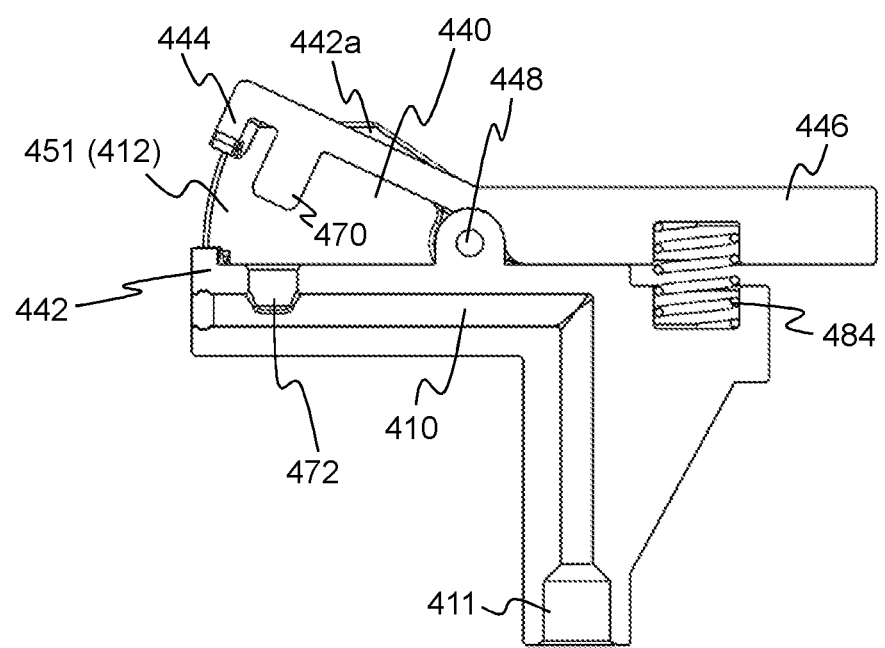
FIG. 4B shows the partial dispensing device of FIG. 4A in its second, open configuration.

FIGS. 4A and 4B illustrate part of a dispensing device according to a fourth embodiment of the invention. FIG. 4A illustrates the dispensing device in its first configuration; FIG. 4B shows the second configuration. Like the third embodiment, the fourth embodiment may be understood most easily as a variant of the second embodiment. For simplicity, the container is not shown in FIGS. 4A and 4B. Nevertheless, it will be understood that the dispensing device of the fourth embodiment may be mounted on a container 130 in the same way as the other embodiments.

The dispensing device comprises a dispensing channel 410, which has an inlet 411 and an outlet 412. The inlet 411 is configured to communicate with a valve-element 120 of the container 130 containing the foamable product. The outlet 412 is suitable for dispensing the foamable product. The dispensing channel 410 comprises a variable-volume cavity 440 at the outlet 412, in the space defined between a first component 442 and a second component 444. The second component 444 is pivotally connected with the first component 442 and rotatable relative to the first component 442 about an axis 448. This rotational movement varies the volume of the cavity 440.

Unlike the first to third embodiments, in the fourth embodiment, the cavity 440 has a nonzero volume in the first configuration (see FIG. 4A) because the first and second components 442 and 444 do not meet flush with one another in this configuration. To transition to the second configuration, the second component 444 rotates (clockwise, as shown) away from the first component 442. This rotation enlarges the cavity 440 and opens the outlet 412.

In the fourth embodiment, the outlet 412 is defined by an opening 451 between the outer end of the first component 442 and the outer end of the second component 444. These two ends meet one another in the first configuration, acting like a pair of jaws, to close the outlet 412. Similarly to the second and third embodiments, the first component 442 forms the floor of the variable-volume cavity 440 and the second component 444 forms the ceiling of the cavity 440. In this embodiment, the sides of the cavity are formed by sidewalls 442a, which are attached to and may be formed integrally with the first component 442. Thus, the sidewalls 442a remain stationary as the second component 444 rotates.

The dispensing channel 410 comprises a passage that extends inside the first component 442 beneath the cavity 440. This passage is in fluid communication with the cavity 440 via a hole 472 extending between the cavity and the passage. The second component 444 comprises a downwardly oriented projection 470, which extends inwardly into the hole 472 in the first configuration, thereby plugging the hole 472 in this configuration.

A lever arm 446 is rigidly connected with the second component 444, at the opposite side of the axis 448 from the second component 444. A resilient biasing means, comprising a spring 484, is provided to urge the lever arm 446 upwards (anticlockwise as drawn) and thus bias the second component 444 downwards towards the first configuration.

The principal differences between the fourth embodiment and the second embodiment are therefore: (i) the fact that the opening 451 is defined between the two components 442 and 444, instead of being defined in one of the components; (ii) the attachment of the sidewalls 442a to the first component 442 instead of the second component; (iii) the position of the biasing spring 484; and (iv) the fact that the variable-volume cavity 440 has a non-zero volume in the first configuration. However, the operation of the dispensing device according to the fourth embodiment is similar to that of the second embodiment (and third embodiment) described already above.

Although specific embodiments have been described above, those skilled in the art will appreciate that various modifications are possible.

For example, in a variant of the first embodiment, the piston 160 may include outwardly facing projections, configured to engage in the openings 151 and 152 in the first configuration. This may contribute to the secure closure of the outlet 112 in the first configuration. It may also allow a further reduction in the dead volume, as residual foam can be pushed out of the openings 151 and 152 by these projections, as the piston moves back to the first configuration. In some embodiments, the tips of the projections may form a continuous surface with the exterior of the dispensing device, to achieve a dead volume that is substantially zero.

As another example, although it is preferable for the actuator to bias the inlet of the dispensing channel against the valve-element of the container, it may also be possible for the actuator to directly actuate the valve-element of the container. This design may provide other benefits such as being able to reduce the structural requirements of the dispensing channel. Referring still to the actuator, the actuator may, dependent on the properties of the dispensing channel, contact a range of points along the dispensing channel and still bias the inlet of the dispensing channel against the valve-element of the container; this range could be defined as being within 75 to 100%, 50 to 100%, or 25 to 100% of the distance from the outlet to the inlet, 100% meaning actuation in line with the inlet. Even further still, the nature of the fixing means used to fix the position of the outlet of the dispensing channel relative to the shroud can vary without departing from the scope of the claims. For instance, the outlet of the dispensing channel may be fixed relative to the shroud through physical contact with another component, the other component being in physical contact with the shroud. The method by which the container is coupled to the shroud may also vary. Although shown as a snap-fit connection in the drawings, the container could be coupled to the shroud through use of an interference fit, a screw-fit, a bayonet-fit, an adhesive, and/or other suitable means.

The nature of the interaction between the dispensing channel and the valve-element of the container may also vary. Two commonly used types of container valve-element are the male type and the female type. Either type is suitable to work with embodiments of the present invention. The male type, as shown in FIGS. 1-3, comprises a valve-stem, which in this case is securely engaged with the inlet of the dispensing channel. The female type, not shown, has a spring cup for engagement with a stem. If a female type valve element were to be used, the stem may be provided by the inlet of the dispensing channel or an adapter may be placed between the female type valve-element and an inlet of the dispensing channel as shown in the present drawings. In the embodiments described above, the actuator comprised a lever. In other embodiments, the actuator may take other forms, such as a button.

In various embodiments, including those described above, the first and second components seal against one another (including during their relative motion) to prevent leakage of the foamable product. Thereby, the foamable product can only escape through the outlet. It preferably cannot leak into other parts of the dispensing device.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A dispensing device for dispensing a foamable product, the dispensing device comprising:
   a dispensing channel, the dispensing channel comprising:
      a shroud comprising an outlet, wherein the outlet forms a piston chamber;
      a dispensing channel disposed within the shroud, wherein the dispensing channel comprises
         an inlet for communicating with a valve-element of a container containing the foamable product, and
         an exit forming a piston for dispensing the foamable product from a passage within the piston, wherein the piston is received in the piston chamber such that an end face of the piston extends radially outward from the passage in a plane that is perpendicular to the piston passage and the end face contacts an inner surface of the piston chamber;
   a variable-volume cavity defined by the piston and the piston chamber, the piston being,
   separate from and rigidly movable with respect to the piston chamber to vary the volume of the variable-volume cavity between a first configuration and a second configuration, wherein the piston and the piston chamber move with respect to one another to contact such that the first volume of the cavity is substantially zero, and in the second configuration the variable-volume cavity has a second volume greater than the first volume and the outlet is open such that the foamable product can flow through variable-volume cavity to the outlet.

2. The dispensing device of claim 1, wherein the outlet is defined by at least one opening, the at least one opening being closed in the first configuration.

3. The dispensing device of claim 2, wherein the outlet is defined by a plurality of openings, wherein each of the plurality of openings is closed in the first configuration.

4. The dispensing device of any one of claim 2 wherein the at least one opening is defined between the piston chamber and the piston.

5. The dispensing device of any one of claim 2, wherein the at least one opening is defined in the piston chamber.

6. The dispensing device of claim 5, wherein the piston chamber comprises at least one inwardly facing projection configured to engage in the exit of the dispensing channel in the first configuration.

7. The dispensing device of claim 1, wherein the piston is slidable relative to the piston chamber.

8. The dispensing device of claim 1, wherein the outlet is defined in an end of the piston chamber.

9. The dispensing device of claim 1, wherein a dead volume at the outlet in the first configuration is less than about 100 mm$^3$.

10. The dispensing device of claim 1, wherein the piston seals against the piston chamber to close the outlet.

11. The dispensing device of claim 10, wherein the piston chamber comprises an inwardly facing projection configured to plug the exit of the dispensing channel in the first configuration.

12. The dispensing device of claim 1, wherein the piston and the piston chamber are in planar face-to-face contact with one another in the first configuration such that the first volume of the cavity is substantially zero.

* * * * *